(12) United States Patent
Sato

(10) Patent No.: US 8,108,140 B2
(45) Date of Patent: Jan. 31, 2012

(54) NAVIGATION DEVICE

(75) Inventor: Hideki Sato, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 564 days.

(21) Appl. No.: 12/235,226

(22) Filed: Sep. 22, 2008

(65) Prior Publication Data

US 2009/0082966 A1 Mar. 26, 2009

(30) Foreign Application Priority Data

Sep. 25, 2007 (JP) ................................ P2007-247783
Aug. 27, 2008 (JP) ................................ P2008-218126

(51) Int. Cl.
*G01C 21/10* (2006.01)
*G01P 3/487* (2006.01)

(52) U.S. Cl. .......................... 701/207; 701/213; 701/216

(58) Field of Classification Search ................... 701/207, 701/216, 213, 220
See application file for complete search history.

(56) References Cited

U.S. PATENT DOCUMENTS

| | | | | |
|---|---|---|---|---|
| 5,862,511 | A * | 1/1999 | Croyle et al. | 701/213 |
| 6,408,245 | B1 * | 6/2002 | An et al. | 701/216 |
| 6,697,736 | B2 * | 2/2004 | Lin | 701/214 |
| 2002/0169553 | A1 * | 11/2002 | Perlmutter et al. | 701/214 |
| 2002/0177950 | A1 * | 11/2002 | Davies | 701/213 |
| 2006/0247854 | A1 * | 11/2006 | Esaki et al. | 701/210 |
| 2007/0067096 | A1 * | 3/2007 | Ohkubo et al. | 701/207 |

FOREIGN PATENT DOCUMENTS

| | | |
|---|---|---|
| EP | 1760475 A2 | 3/2007 |
| JP | 09-42979 | 2/1997 |
| JP | 11295089 A | 10/1999 |

* cited by examiner

*Primary Examiner* — Tan Q Nguyen
(74) *Attorney, Agent, or Firm* — Dickstein Shapiro LLP

(57) ABSTRACT

A navigation device is designed to calculate the present position thereof based on the output data of a GPS unit in association with an acceleration sensor and a magnetic sensor. When the absolute value of the acceleration detected by the acceleration sensor is above the prescribed threshold, the navigation device calculates the present position based on the previously detected values of the position and running speed stored in memory. When the absolute value of the acceleration is below the prescribed threshold, the navigation device detects the uniform motion applied thereto; hence, it calculates the present position based on the bearing detected by the magnetic sensor as well as the previously detected values of the position and running speed stored in the memory with high precision irrespective of the offset error of the acceleration sensor.

3 Claims, 6 Drawing Sheets

NAVIGATION DEVICE

BACKGROUND OF THE INVENTION

1. Field of the Invention

The present invention relates to navigation devices for detecting present positions and for performing positional guidance.

The present application claims priority on Japanese Patent Application No. 2007-247783 and Japanese Patent Application No. 2008-218126, the contents of which are incorporated herein by reference.

2. Description of the Related Art

Conventionally, two types of navigation devices are provided for detecting present positions of vehicles so as to perform positional guidance (or travel guidance) for users, i.e., fixed types which are fixedly installed in vehicles via wirings, and handy or portable types which can be easily handled by users to carry outside and which may be referred to as personal navigation devices (PDN). Recently, fixed types of navigation devices (an example of which is disclosed in Patent Document 1) have been developed such that bearings detected by gyro-sensors or geomagnetic sensors and vehicle information such as running speeds of vehicles (detected by speedometers) are used in addition to GPS signals (where GPS stands for Global Positioning System) so as to detect present locations of vehicles with high precisions. Such functions may be highly evaluated in the case where navigation devices cannot receive GPS signals or in the case where GPS signals do not have high precisions.

Patent Document 1: Japanese Unexamined Patent Application Publication No. H09-42979

It is not always easy for portable navigation devices to receive vehicle information given from instruments on dashboards of vehicles. To cope with the case in which portable types of navigation devices cannot receive GPS signals, auxiliary functions are installed in them so as to detect positions by integrating accelerations detected by acceleration sensors.

Generally, acceleration sensors have offset errors and have serious problems I that they cannot achieve adequately high precision in positional detection. Offset errors may occur when acceleration sensors erroneously detect finite acceleration values irrespective of zero accelerated motion. Offset errors may be output from acceleration sensors which are not placed horizontally in vehicles and acceleration sensors which are installed in vehicles running on slopes inclined from the horizontal plane because of gravitational accelerations, which are erroneously detected as accelerations. Although acceleration sensors are placed horizontally in vehicles, offset errors may inevitably occur in acceleration sensors when vehicles run on slopes.

SUMMARY OF THE INVENTION

It is an object of the present invention to provide a navigation device having, which is capable of detecting positions with high precision irrespective of offset error.

A navigation device of the present invention is designed to perform positional guidance and is constituted of a GPS unit for detecting a first position ($P_{GPS}$) based on the Global Positioning System (GPS) and for detecting a first running speed ($V_{GPS}$) based on the position, an acceleration sensor for detecting an acceleration, a bearing sensor (e.g. a magnetic sensor) for detecting a bearing, a memory for storing the first position and the first running speed, an acceleration determination unit for evaluating the absolute value of the acceleration detected by the acceleration sensor with the prescribed threshold. The navigation device is further equipped with a position calculation unit for calculating a second position ($P_{INS}$) and a second running speed ($V_{INS}$) based on the first position and the first running speed previously stored in the memory when the acceleration determination unit determines that the absolute value of the acceleration is above the prescribed threshold. The position calculation unit calculates the second position and the second running speed based on the bearing detected by the bearing sensor as well as the first position and the first running speed previously stored in the memory in case of the uniform motion at which the acceleration determination unit determines that the absolute value of the acceleration is below the prescribed threshold.

In the above, when the absolute value of the acceleration is below the prescribed threshold, the navigation device determines that the acceleration occurs due to the positional inclination of a vehicle (when it runs on a slope, for example), wherein it determines that the vehicle is presently subjected to uniform motion (having zero acceleration). Therefore, it is possible to calculate the present position of the vehicle with high precision irrespective of the offset error of the acceleration sensor due to the positional inclination of the vehicle.

In addition, the navigation device is further equipped with an optimum value estimation unit for estimating the optimum value of position ($\delta P$) and the optimum value of speed ($\delta V$) by way of a Karman's filter based on the first position and the first running speed detected by the GPS unit as well as the second position and the second running speed, which are calculated by the position calculation unit, an acceleration offset calculation unit for calculating an acceleration offset corresponding to the offset error of the acceleration sensor based on the optimum value of position and the optimum value of running speed, which are estimated by the optimum value estimation unit. Herein, the acceleration determination unit compares the acceleration, which is corrected using the acceleration offset, with the prescribed threshold.

Since the acceleration is corrected using the acceleration offset, it is possible to prevent the offset error of the acceleration sensor from affecting calculation; hence, it is possible to further improve precision in calculating the position of the vehicle. In short, the navigation device of the present invention can calculate the present position of the vehicle with high precision irrespective of the offset error of the acceleration sensor.

In the above, the acceleration offset calculation unit can be redesigned to calculate the calculation offset based on the acceleration detected by the acceleration sensor when variations of the detected acceleration are smaller than a preset value in a prescribed time, wherein the detected acceleration is corrected using the acceleration offset calculated by the acceleration offset calculation unit so as to produce the corrected acceleration, which is then compared with the prescribed threshold by the acceleration determination unit.

That is, the acceleration offset is calculated based on variations of the acceleration detected by the acceleration sensor and is used to correct the detected acceleration. This makes is possible for the navigation device to determine the position with a further high level of precision even when the GPS unit cannot receive GPS signals or even when GPS signals do not have an adequate level of reliability.

BRIEF DESCRIPTION OF THE DRAWINGS

These and other objects, aspects, and embodiments of the present invention will be described in more detail with reference to the following drawings.

DESCRIPTION OF THE PREFERRED EMBODIMENT

The present invention will be described in further detail by way of examples with reference to the accompanying drawings.

Figure 1:
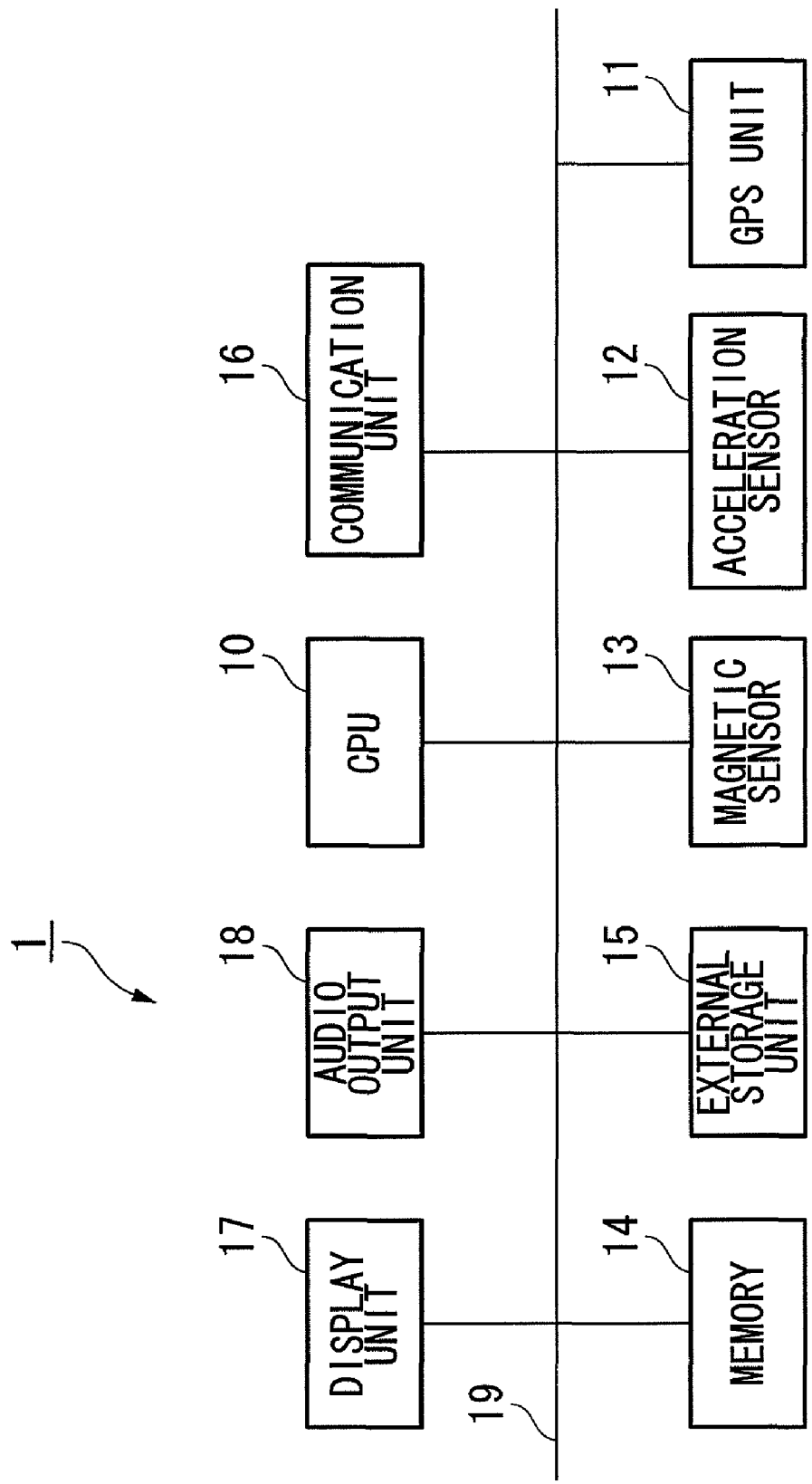
FIG. 1 is a block diagram showing the constitution of a navigation device in accordance with a preferred embodiment of the present invention.

FIG. 1 is a block diagram showing the constitution of a navigation device 1 in accordance with the preferred embodiment of the present invention. The navigation device 1 is constituted of a CPU 10, a GPS unit 11, an acceleration sensor 12, a magnetic sensor 13, a memory 14, an external storage unit 15, a communication unit 16, a display unit 17, and an audio output unit 18, all of which are interconnected via a bus line 19. All the constituent elements 11 to 18 are stored in a single housing, so that the navigation device 1 has portability and can be attached to the desired place of a vehicle (not shown). The following description is made on the presumption that the navigation device 1 is installed in the vehicle.

The CPU 10 loads programs stored in the memory 14 so as to control the constituent elements 11 to 18 in accordance with programs. The CPU 10 performs a position calculation process (details of which will be described in conjunction with FIGS. 2 to 4) based on the output signals of the GPS unit 11, the acceleration sensor 12, and the magnetic sensor 13. The CPU 10 also performs information processing implementing navigation functions.

The GPS unit 11 triangulates the latitude, longitude, and altitude (representing the present position of the vehicle) based on the Global Positioning System (GPS). In addition, the GPS unit 11 also calculates the running speed and running direction of the vehicle based on the latest position and the preceding position of the vehicle. The GPS unit 11 outputs various pieces of information representing the position, the running speed, and the running direction of the vehicle. The GPS unit 11 receives GPS signals from stationary satellites so as to perform calculations using reception times of GPS signals (which are counted by a time counter, not shown), thus determining the present position.

The acceleration sensor 12 detects an acceleration applied to the vehicle (or the navigation device 1) so as to produce and output acceleration information to the CPU 10. The acceleration embraces an acceleration applied to the acceleration sensor 12 in an accelerated motion of the vehicle and a gravitational acceleration detected by the acceleration sensor 12 when the vehicle is inclined in position on the slope and the like. In the present embodiment, the acceleration sensor 12 is a two-axial acceleration sensor which detects acceleration components in two axial directions (which cross perpendicularly with each other). Specifically, one of the two axes (e.g. an x-axis and a y-axis) of the acceleration sensor 12 substantially matches the reference axis of the magnetic sensor 13. The CPU 10 receives the acceleration information including acceleration components in the x-y coordinates system with reference to the reference axis of the magnetic sensor 13. Acceleration components detected by the acceleration sensor 12 may include offset errors due to the gravitational acceleration which is inevitably detected by the acceleration sensor 12.

The magnetic sensor 13 detects geomagnetism applied to the vehicle (or the navigation device 1) so as to calculate the bearing directed by the reference axis thereof, thus producing and outputting bearing information to the CPU 10. The following description is made on the presumption that the reference axis of the magnetic sensor 13 deviates from the front-forward direction of the vehicle by a certain angle. This is because the user may place the navigation device 1 having portability in the vehicle in a desired place and position. As the magnetic sensor 13, it is possible to use either a two-axial magnetic sensor (for detecting magnetic components in two axes perpendicularly crossing each other) or a three-axial magnetic sensor (for detecting magnetic components in three axes perpendicularly crossing each other). In the case of the two-axial magnetic sensor, for example, two elements (e.g. magnetoresistive elements) are arranged in two axes so as to detect the magnitudes of geomagnetism, by which the bearing of the reference axis is calculated.

The memory 14 is constituted of a ROM and a RAM. The ROM stores programs to be executed by the CPU 10. The RAM serves as a storage area for storing temporary data which is produced during the execution of programs.

The external storage unit 15 is a large-scale storage unit such as a hard-disk drive, which stores map information necessary for navigation.

The communication unit 16 establishes connection with the Internet via wireless communication so as to download the latest map information and the like, which is then stored in the external storage unit 15.

The display unit 17 graphically displays the present position and bearing of the vehicle on the map so as to achieve the positional guidance by way of navigation functions executed by the CPU 10.

The audio output device 18 performs audio guidance by generating vocalized sound (which may instruct the user or driver to turn at the intersection at the appropriate timing) using a speaker.

Figure 2:
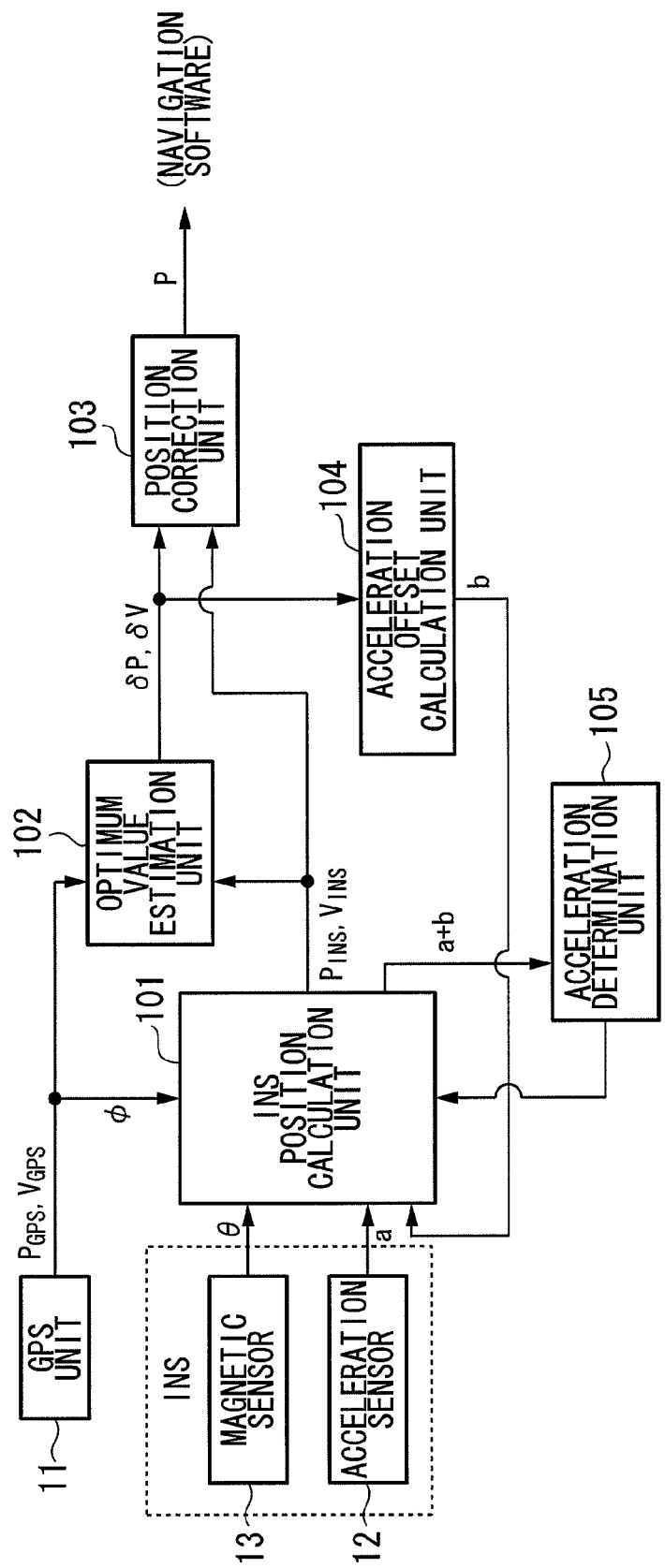
FIG. 2 is a block diagram showing the constitution for implementing a position calculation process in the navigation device.

Next, the details of the position calculation process for calculating the present position based on the output signals of the acceleration sensor 12 and the magnetic sensor 13 will be described with reference to FIG. 2. FIG. 2 is a block diagram showing the constitution for implementing the position calculation process, which is constituted of an INS position calculation unit 101 (where "INS" stands for "Inertial Navigation System" constituted of the acceleration sensor 12 and the magnetic sensor 13), an optimum value estimation unit 102, a position correction unit 103, an acceleration offset calculation unit 104, and an acceleration determination unit 105. The INS position calculation unit 101 receives the output signals of the GPS unit 11 and the INS (i.e., the acceleration sensor 12 and the magnetic sensor 13). The CPU 10 executes programs read from the memory 14 so as to implement the functions of the constituent elements 101 to 105 shown in FIG. 2.

The INS position calculation unit 101 inputs an acceleration a=(ax, ay) (where "ax" designates an x-axis acceleration component, and "ay" designates a y-axis acceleration component including an offset error from the acceleration sensor 12. It also inputs the bearing θ of the reference axis from the magnetic sensor 13. It further inputs the running direction φ of the vehicle from the GPS unit 11. Moreover, the INS position calculation unit 101 inputs an acceleration offset value b=(bx.,by) (where "bx" designates an x-axis acceleration components, and "by" designates a y-axis acceleration component) for correcting the offset error included in the acceleration a from the acceleration offset calculation unit 104.

In response to an instruction from the acceleration determination unit 105, the INS position calculation unit 101 calculates the position $P_{INS}$ and the speed $V_{INS}$ of the vehicle based on the input values thereof. The INS position calculation unit 101 outputs the calculated values of the position $P_{INS}$ and the speed $V_{INS}$ to the optimum value estimation unit 102 and the position correction unit 103.

Specifically, when the acceleration determination unit 105 determines that the absolute value of the acceleration a+b is higher than a prescribed threshold, the INS position calculation unit 101 calculates the position $P_{INS}$ and the speed $V_{INS}$ in accordance with equations (1A) to (1F) in a first calculation mode, as follows:

$$aN = -(ax + bx) \cdot \sin\theta + (ay + by) \cdot \cos\theta \quad (1A)$$

$$aE = (ax + bx) \cdot \cos\theta + (ay + by) \cdot \sin\theta \quad (1B)$$

$$VN_{INS} = VN0_{INS} + aN \cdot \Delta t \quad (1C)$$

$$VE_{INS} = VE0_{INS} + aE \cdot \Delta t \quad (1D)$$

$$PN_{INS} = PN0_{INS} + \sin^{-1}\left(\frac{VN_{INS} \times \Delta t}{R}\right) \quad (1E)$$

$$PE_{INS} = PE0_{INS} + \sin^{-1}\left(\frac{VE_{INS} \times \Delta t}{R \times \cos PN0_{INS}}\right) \quad (1F)$$

In the above, aN and aE designate the latitude component and longitude component of the acceleration a+b; $VN_{INS}$ and $VE_{INS}$ designate the latitude component and longitude component of the speed $V_{INS}$; $PN_{INS}$ and $PE_{INS}$ designate the latitude component and longitude component of the position $P_{INS}$; $VN0_{INS}$, $VE0_{INS}$, $PN0_{INS}$, and $PE0_{INS}$ designate the previously calculated values of $VN_{INS}$, $VE_{INS}$, $PN_{INS}$, and $PE_{INS}$; Δt designates a lapsed time which elapses between the preceding calculation timing and the present calculation timing; and R designates the radius of the earth.

When the acceleration determination unit 105 determines that the absolute value of the acceleration a+b is lower than the prescribed threshold, the INS position calculation unit 101 calculates the position $P_{INS}$ and the speed $V_{INS}$ in accordance with equations (2A) to (2E) (in which the equations (2D) and (2E) are identical to the equations (1E) and (1F)) in a second calculation mode, as follows:

$$V = \sqrt{VN0_{INS}^2 + VE0_{INS}^2} \quad (2A)$$

$$VN_{INS} = V \times \cos\theta c \quad (2B)$$

$$VE_{INS} = V \times \sin\theta c \quad (2C)$$

$$PN_{INS} = PN0_{INS} + \sin^{-1}\left(\frac{VN_{INS} \times \Delta t}{R}\right) \quad (2D)$$

$$PE_{INS} = PE0_{INS} + \sin^{-1}\left(\frac{VE_{INS} \times \Delta t}{R \times \cos PN0_{INS}}\right) \quad (2E)$$

Figure 4:
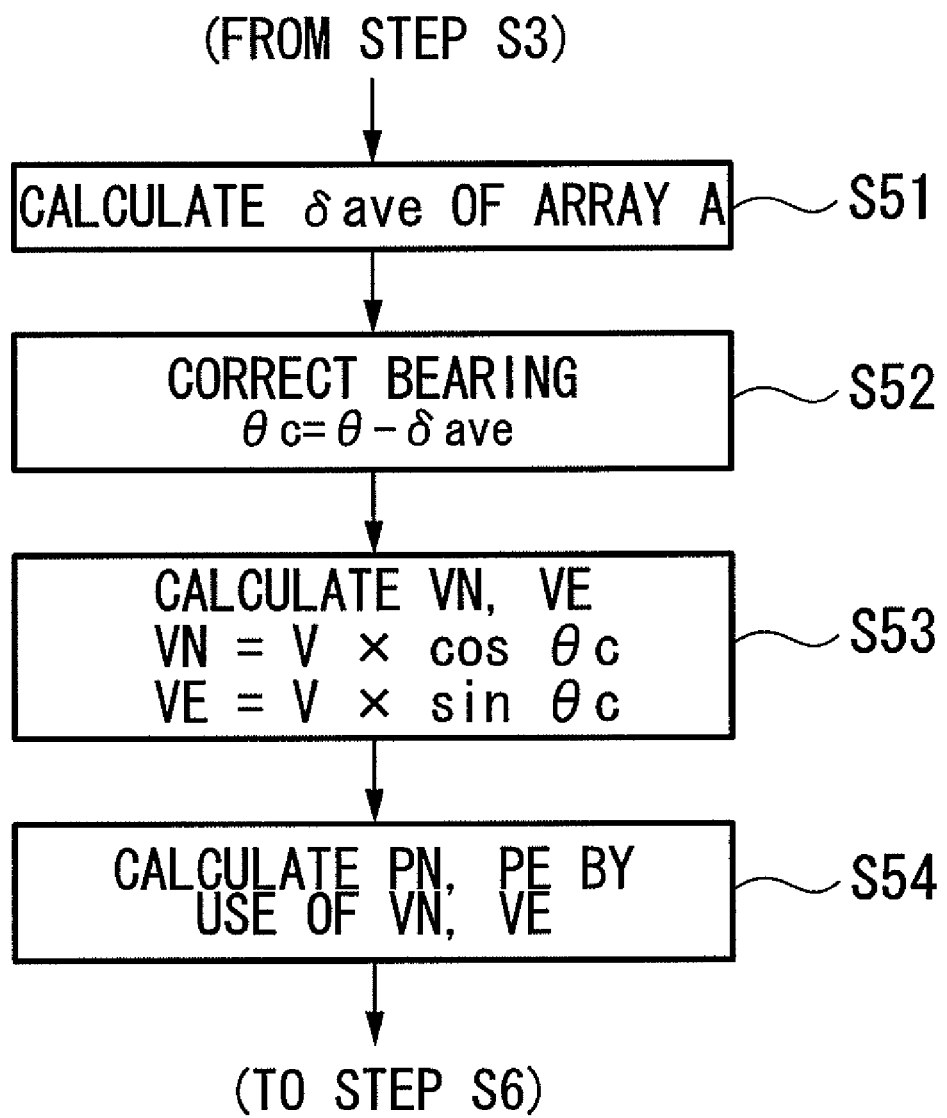
FIG. 4 is a flowchart showing the details of step S5 shown in FIG. 3 for updating the position $P_{INS}$ in the uniform motion of a vehicle.

In the above, θc designates the corrected value of the bearing θ which is calculated in step S52 shown in FIG. 4 on the presumption that the reference axis of the magnetic sensor 13 deviates from the front-forward direction of the vehicle.

As described above, when the absolute value of the acceleration is above the prescribed threshold, the navigation device 1 determines that the vehicle is presently subjected to accelerated motion based on the acceleration components aN and aE, wherein the INS position calculation unit 101 calculates the speed $V_{INS}$ and also calculates the position $P_{INS}$ based on the speed $V_{INS}$. When the absolute value of the acceleration is below the prescribed threshold, the navigation device 1 determines that the vehicle is presently subjected to uniform motion based on the previously calculated values of speeds $VN0_{INS}$ and $VE0_{INS}$, wherein the INS position calculation unit 101 calculates the speed $V_{INS}$ and the position $P_{INS}$. In the actuality, the vehicle performs uniform motion when it runs on a slope, for example; hence, even when an offset error is included in the acceleration a detected by the acceleration sensor 12, the INS position calculation unit 101 calculates the position of the vehicle on the presumption that the vehicle is presently subjected to uniform motion; thus, it is possible to calculate the position with high precision without being affected by the offset error.

In this connection, it is possible to perform the position calculation process regarding the position $P_{INS}$ on the presumption that the vehicle is presently subjected to uniform motion only when the GPS unit 11 does not receive GPS signals or only when GPS signals do not have a high reliability. When the GPS unit 11 receives GPS signals, the optimum value estimation unit 102 and the acceleration offset calculation unit 104 may effectively operate so as to calculate the acceleration offset b, by which the offset error of the acceleration sensor 12 is corrected, whereby it is possible to precisely calculate the position $P_{INS}$ in accordance with the equations (1A) to (1F) in the first calculation mode even when the accelerations aN and aE have small values. In contrast, when the GPS unit 11 cannot receive GPS signals because the vehicle runs through a tunnel, for example, the optimum value estimation unit 102 and the acceleration offset calculation unit 104 cannot effectively operate so that the offset error of the acceleration sensor 12 cannot be corrected, wherein the calculated values of the accelerations aN and aE may not have a high reliability. In this case, the offset error may greatly affect the detection result of the acceleration sensor 12 when the acceleration has a relatively small absolute value, the navigation device 1 automatically switches over the processing thereof to the second calculation mode in which the position $P_{INS}$ is calculated in accordance with the equations (2A) to (2E) on the presumption that the vehicle is subjected to uniform motion. This is a great significance of the present invention.

The optimum value estimation unit 102 inputs the position $P_{INS}$ and the speed $V_{INS}$ from the INS position calculation unit 101 while inputting the position $P_{GPS}$ and the speed $V_{GPS}$ from the GPS unit 11. Due to differences of principles of estimation, the position $P_{INS}$ and the speed $V_{INS}$ of the INS calculation unit 101 may differ from the position $P_{GPS}$ and the speed $V_{GPS}$ of the GPS unit 11; hence, all the values of $P_{INS}$, $V_{INS}$, $P_{GPS}$, and $V_{GPS}$ have specific errors thereof. The optimum value estimation unit 102 is used to estimate values having high probabilities based on the input values thereof.

Every time the optimum value estimation unit 102 receives the detected values of the position $P_{GPS}$ and the speed $V_{GPS}$ from the GPS unit 11, it calculates a positional difference $\delta Pc = P_{GPS} - P_{INS}$ and a speed difference $\delta Vc = V_{GPS} - V_{INS}$, based on which it estimate the optimum values (having high probabilities) $\delta P$ and $\delta V$. The estimation of the optimum values $\delta P$ and $\delta V$ is performed by operations using a Karman's filter, details of which will be described later. The optimum value estimation unit 102 delivers the optimum values $\delta P$ and $\delta V$ (which are estimated as described above) to the position correction unit 103 and the acceleration offset calculation unit 104.

The position correction unit 103 corrects the position $P_{INS}$ of the vehicle (output from the INS calculation unit 101) by use of the optimum value $\delta P$ (output from the optimum value estimation unit 102) in accordance with an equation (3), thus producing the position P having a highest probability.

$$P = P_{INS} + \delta P \quad (3)$$

Then, the position correction unit 103 provides the navigation software (executed by the CPU 10) with the position P representative of the present position of the vehicle.

Based on the optimum value $\delta P$ output from the optimum value estimation unit 102, the acceleration offset calculation unit 104 calculates the acceleration offset b which is the correction value for correcting the offset error included in the acceleration a detected by the acceleration sensor 12. The acceleration offset calculation unit 104 outputs the acceleration offset b to the INS position calculation unit 101. An equation for calculating the acceleration offset b based on the optimum value $\delta P$ (of the positional difference) is determined based on the following presumption.

If the INS position calculation unit 101 completely corrects the acceleration a detected by the acceleration sensor 12 in the preceding cycle of processing so as to eliminate the offset error, the optimum value $\delta P$ of the optimum value estimation unit 102 should be zero. If the INS position calculation unit 101 does not completely correct the acceleration a of the acceleration sensor 12 so that some offset error may still remain, an imperfect value of acceleration offset (referred to as bc) may cause an error in the position $P_{INS}$ calculated by the INS position calculation unit 101, based on which the optimum value estimation unit 102 may erroneously produce the optimum value $\delta P$, which indicates a positional error caused by the uniformly accelerated motion of the vehicle at the acceleration bc and which is expressed by an equation (4).

$$\delta P = \frac{1}{2} \cdot bc \cdot \Delta T^2 \quad (4)$$

It is presumed that the acceleration offset calculation unit 104 calculates the acceleration offset b in accordance with an equation (5).

$$b = b0 + 2 \cdot \frac{\delta Pxy}{\Delta T^2} \quad (5)$$

In the above, b0 indicates a preceding value of the acceleration offset which is used by the INS position calculation unit 101 in the preceding cycle of processing for correcting the acceleration a detected by the acceleration sensor 12; $\Delta T$ indicates a lapsed time between the preceding timing for correcting the acceleration and the present timing for correcting the acceleration; and $\delta Pxy$ designates a value produced by converting the optimum value $\delta P$ (representative of the latitude and longitude output from the optimum value estimation unit 102) to suit the x-y coordinates system fixedly applied to the vehicle, wherein the $\delta P$ is subjected to rotation of the bearing $\theta$ so as to produce $\delta Pxy$.

Thus, the acceleration offset calculation unit 104 calculates and outputs the acceleration offset b to the INS position calculation unit 101, which in turn corrects the acceleration a (detected by the acceleration sensor 12) by adding the acceleration offset b to the acceleration a in accordance with the equations (1A) and (1B).

The navigation device 1 performs the aforementioned processing, in which the INS position calculation unit 101 corrects the acceleration a by use of the acceleration offset b calculated by the acceleration offset calculation unit 104, as necessary; hence, this processing can be omitted. When the aforementioned processing is omitted, the acceleration determination unit 105 (details of which will be described below) does not handle the acceleration a+b but the acceleration a. Due to the aforementioned processing, the acceleration a including the offset error is corrected; then, when the corrected value of the acceleration is smaller than the prescribed threshold, the position of the vehicle is calculated based on the presumption that the vehicle is subjected to uniform motion; hence, it is possible to calculate the position with a further high precision.

Figure 3:
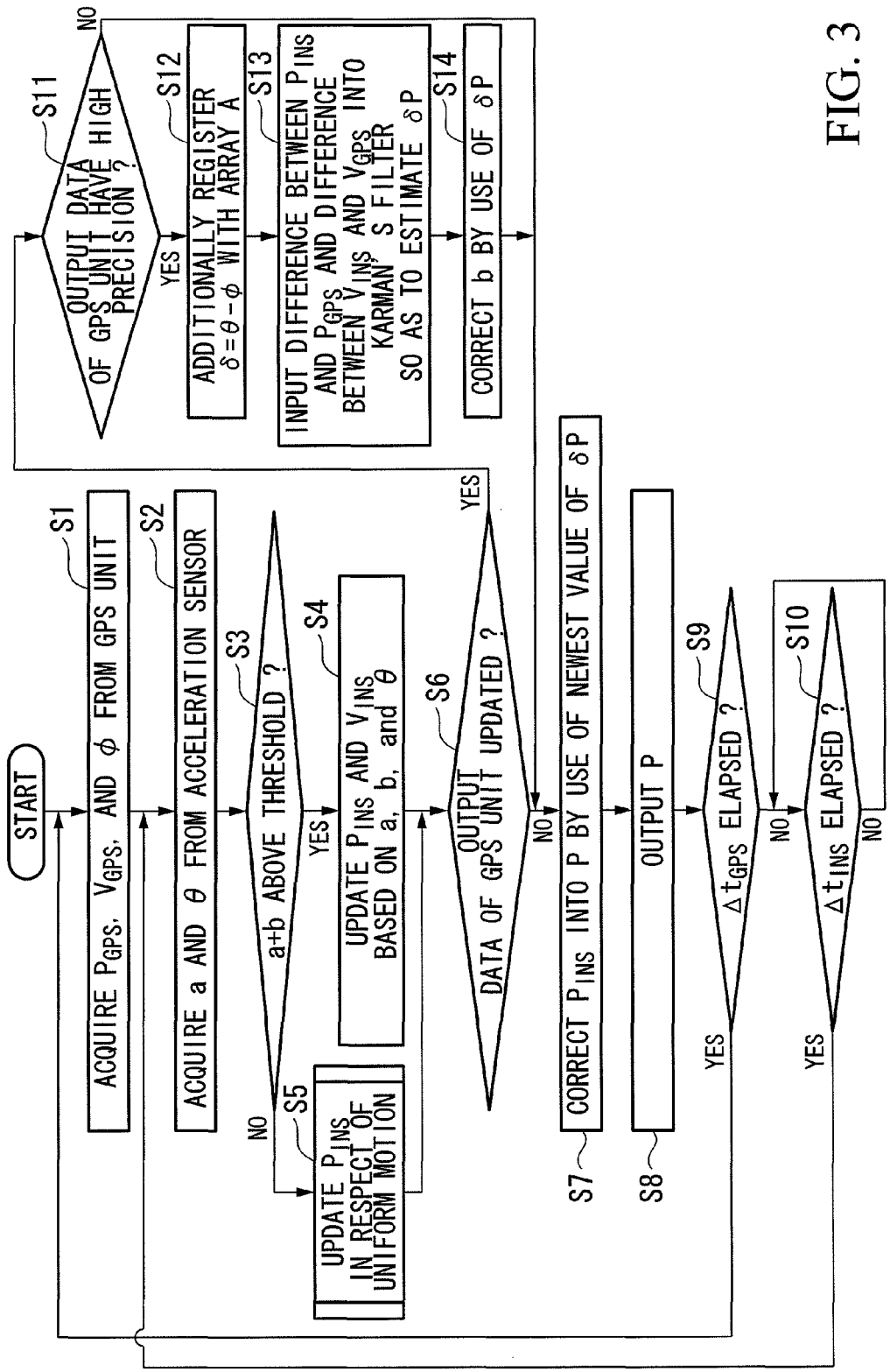
FIG. 3 is a flowchart showing the position calculation process executed in the navigation device.

Next, the operation of the navigation device 1 will be described with reference to the flowchart of FIG. 3.

In step S1, the CPU 10 inputs the position $P_{GPS}$, the speed $V_{GPS}$, and the running direction $\phi$ of the vehicle from the GPS unit 11 so as to store them in the memory 14. In step S2, the CPU 10 inputs the acceleration a (including an offset error) from the acceleration sensor 12 and the bearing $\theta$ of the reference axis of the magnetic sensor 13 so as to store them in the memory 14. In step S3, the CPU 10 adds the acceleration offset b, which is stored in the memory 14 in advance, to the acceleration so as to produce the sum of acceleration a+b; then, it makes a decision as to whether or not the absolute value of a+b is above the prescribed threshold. In the first cycle of execution of step S3, the acceleration offset b is set to an initial value b=(0,0). Once step S14 is executed, the acceleration offset b is set to a certain value calculated in step S14; hence, the memory 14 stores it.

When the absolute value of a+b is above the prescribed threshold, the flow proceeds to step S4 in which the INS position calculation unit 101 calculates the position PINS and the speed VINS of the vehicle in accordance with the equations (1A) to (1F). When the absolute value of a+b is below the prescribed threshold, the flow proceeds to step S5 in which the INS position calculation unit 101 calculates the position $P_{INS}$ and the speed $V_{INS}$ of the vehicle in accordance with the equations (2A) to (2E).

It is possible to introduce an additional step prior to step S3 so as to evaluate the detection precision of the GPS unit 11, whereby the flow proceeds to step S3 only when the GPS unit 11 does not receive GPS signals or only when GPS signals do not have high precision, and whereby the flow proceeds to step S4 so as to calculate the position $P_{INS}$ and the speed $V_{INS}$ of the vehicle when GPS signals have high precision. This is because, when GPS signals have high precision, it is highly expected that the INS position calculation unit 101 calculates the position PINS having high precision by use of the corrected value of acceleration, which is corrected using the acceleration offset b (calculated in step S14), in accordance with the equations (1A) to (1F).

In step S6, the CPU 10 makes a decision as to whether or not the position $P_{GPS}$ and the speed $V_{GPS}$ (output from the GPS unit 11) are updated. The step S1 is repeatedly executed with a certain time interval $\Delta t_{GPS}$, whereas the step S2 is repeatedly executed with another time interval $\Delta t_{INS}$ ($<\Delta t_{GPS}$); hence, before the lapse of the time interval $\Delta t_{GPS}$, the position $P_{GPS}$ and the speed $V_{GPS}$ are not updated, so that the decision result of step S6 is "NO".

In this case, the flow proceeds to step S7 in which the position correction unit 103 corrects the position $P_{INS}$ (calculated in step S4 or step S5) by use of the newest optimum value δP stored in the memory 14, thus calculating the present position P of the vehicle having the highest probability. The optimum value δP is calculated in the preceding execution of step S13 (which will be described below) and is stored in the memory 14 in advance. In step S8, the position correction unit 103 provides the navigation software with the position P, which is produced by correcting the position $P_{INS}$ calculated by the INS position calculation unit 101.

In step S9, the CPU 10 makes a decision as to whether or not the time interval $\Delta t_{GPS}$ has elapsed. After the lapse of the time interval $\Delta t_{GPS}$, the CPU 10 repeatedly executes the position calculation process of FIG. 3 starting from step S1. Then, after the lapse of the time interval $\Delta t_{INS}$, the flow proceeds to step S2 again so as to execute its following steps. As described above, the position $P_{GPS}$ and the speed $V_{GPS}$ output from the GPS unit 11 are updated with the time interval $\Delta t_{GPS}$, while the position $P_{INS}$ and the speed $V_{INS}$ calculated by the INS position calculation unit 101 are updated with the time interval $\Delta t_{INS}$. For example, the time interval $\Delta t_{GPS}$ is set to one second, and the time interval $\Delta t_{INS}$ is set to 0.2 second.

When the output data of the GPS unit 11 is updated, the decision result of step S6 turns to "YES" so that the flow proceeds to step S11 in which a decision is made as to whether or not the output data of the GPS unit 11 has adequately high precision. For example, the CPU 10 determines that the GPS unit 11 has an adequately high precision when the speed $V_{GPS}$ is above a prescribed threshold. When "YES", the flow proceeds to step S12 in which the CPU 10 calculates the difference δ=θ−φ between the bearing θ of the reference axis of the magnetic sensor 13 (acquired in step S2) and the running direction φ of the vehicle (acquired in step S1), then, it additionally registers the difference δ with the array A. The difference δ indicates how much the bearing θ of the magnetic sensor 13 deviates from the running direction φ of the vehicle.

In step S13, the optimum value estimation unit 102 estimates the optimum values δP and δV based on the differences δPc=$P_{GPS}$−$P_{INS}$ and δVc=$V_{GPS}$−$V_{INS}$, which are calculated based on the positions and speeds acquired in steps S1, S4, and S5. The estimated optimum values δP and δV are stored in the memory 14. In step S14, the acceleration offset calculation unit 104 calculates the acceleration offset based on the optimum value δP. The acceleration offset b is stored in the memory 14 and is then used for the determination of the acceleration a+b compared with the prescribed threshold. After completion of step S14, the flow proceeds to step S7 in which the position correction unit 103 corrects the position $P_{INS}$ by use of the optimum value δP (which is estimated in step S13) so as to calculate the present position P of the vehicle having the highest probability.

When the CPU 10 determines in step S11 that the GPS 11 does not have an adequately high precision of detection, the flow directly proceeds to step S7 by skipping step S11, S12, S13 (for estimation of the optimum values δP and δV), and step S14 (for calculation of the acceleration offset b). This prevents the position correction unit 103 and the acceleration offset calculation unit 104 from erroneously calculating the position P and the acceleration offset b with low precision when the optimum value estimation unit 102 erroneously estimates the optimum value δP with low precision based on the output data of the GPS unit 11 having low precision.

Next, the details of step S5 will be described with reference to the flowchart of FIG. 4, in which the INS position calculation unit 101 calculates the position PINS and the speed VINS when the absolute value of the acceleration a+b is smaller than the prescribed threshold.

In step S51, the INS position calculation unit 101 calculates the average δave among the values of the difference δ which are stored in the array A in step S12 at different times. In step S52, the INS position calculation unit 101 corrects the bearing θ of the magnetic sensor 13 (which is acquired in step S2) by use of the average value δave in accordance with an equation (6).

$$\theta c = \theta - \delta ave \qquad (6)$$

With the equation (6), the bearing θ is corrected to θc substantially representing the running direction of the vehicle; in other words, the running direction of the vehicle is determined based on the bearing θ of the magnetic sensor 13. In step S53, the INS position calculation unit 101 calculates the speed $V_{INS}$ by use of the corrected bearing θc in accordance with the equations (2B) and (2C). In step S54, the INS calculation unit 101 calculates the position $P_{INS}$ in accordance with the equations (2D) and (2E).

Next, the estimation process for estimating the optimum values δP and δV in the optimum value estimation unit 102 will be described in detail.

The estimation process of the optimum value estimation unit 102 is performed using a Karman's filter with respect to a detection vector (or an input vector) z and a state vector (or an output vector) x in accordance with state equations (7) representing time-related variations of the state vector, as follows:

$$z = \begin{pmatrix} PN_{GPS} - PN_{INS} \\ PE_{GPS} - PE_{INS} \\ VN_{GPS} - VN_{INS} \\ VE_{GPS} - VE_{INS} \end{pmatrix} \qquad (7)$$

$$x = \begin{pmatrix} \delta PN \\ \delta PE \\ \delta VN \\ \delta VE \end{pmatrix}$$

$$\dot{x} = Fx$$

$$F = \begin{pmatrix} 0 & 0 & 1 & 0 \\ 0 & 0 & 0 & 1 \\ 0 & 0 & 0 & 0 \\ 0 & 0 & 0 & 0 \end{pmatrix}$$

In the above, $PN_{GPS}$ and $PE_{GPS}$ designate the latitude and longitude components of the position $P_{GPS}$ output from the GPS unit 11, while $VN_{GPS}$ and $VE_{GPS}$ designate the latitude and longitude components of the speed $V_{GPS}$ output from the GPS unit 11. In addition, δPN and δPE designate the latitude and longitude components of the optimum v value δP, while δVN and δVE designate the latitude and longitude components of the optimum value δV. Furthermore, the suffix "INS" indicates the variables in connection with the inertial navigation system (INS).

In the aforementioned definition, the state vector x (corresponding to the output of the Karman's filter) is expressed by an equation (8), wherein k (where k=1, 2, . . . ) is a suffix indicating the number of times for estimating optimum values with respect to time.

$$x_k = K_k z_k \qquad (8)$$

In the above, $K_k$ indicates the Karman's gain, which is calculated by equations (9) as follows:

$$K_k = P_k(-)[P_k(-) + R_k]^{-1} \qquad (8)$$

$$P_k(-) = \Phi_{k,k-1} P_{k-1}(+) \Phi_{k,k+1}^T + Q$$

$$\Phi_{k,k-1} = e^{\Delta t f} \approx I + F\Delta t = \begin{pmatrix} 1 & 0 & \Delta t & 0 \\ 0 & 1 & 0 & \Delta t \\ 0 & 0 & 1 & 0 \\ 0 & 0 & 0 & 1 \end{pmatrix}$$

$$P_k(+) = P_k(-) - K_k P_k(-)$$

In the above, Δt designates a lapsed time between the preceding timing of correcting the acceleration using the acceleration offset b, which is calculated based on the optimum value δP produced by (k−1) times estimation, and the present timing of correcting the acceleration by way of k times estimation, wherein initial values of determinants R, P, and Q are expressed by equations (9) as follows:

$$R = \begin{pmatrix} 1.0 & 0 & 0 & 0 \\ 0 & 1.0 & 0 & 0 \\ 0 & 0 & 0.01 & 0 \\ 0 & 0 & 0 & 0.01 \end{pmatrix} \qquad (9)$$

$$P = \begin{pmatrix} 100 & 0 & 0 & 0 \\ 0 & 100 & 0 & 0 \\ 0 & 0 & 0.1 & 0 \\ 0 & 0 & 0 & 0.1 \end{pmatrix}$$

$$Q = \begin{pmatrix} 0.01 & 0 & 0 & 0 \\ 0 & 0.01 & 0 & 0 \\ 0 & 0 & 0.001 & 0 \\ 0 & 0 & 0 & 0.001 \end{pmatrix}$$

The optimum value estimation unit 102 calculates the state vector x based on the detection vector z in accordance with the aforementioned equations. The calculated value of the state vector x indicates the latitude and longitude components of the optimum value δP and the latitude and longitude components of the optimum value δV.

The present invention is not necessarily limited to the embodiment, which can be modified in a variety of ways without departing from the essential matters thereof.

The present embodiment is preferably applicable to portable types of navigation devices but is also applicable to fixed types of navigation devices. In addition, the term "vehicle" may embrace automobiles, motorcycles, and bicycles.

It is possible to modify the present embodiment such that the acceleration offset calculation unit 104 calculates the acceleration offset b in accordance with an equation (10) as follows:

$$b = b0 + 2 \cdot \frac{\delta Pxy}{\Delta T^2} \cdot r \qquad (10)$$

In the above, r designates a coefficient for updating the acceleration offset b from the preceding value b0, wherein it can be appropriately set to r=0.03, for example.

It is possible to modify the present embodiment such that the acceleration offset calculation unit 104 calculates the acceleration offset b in accordance with an equation (11) using the optimum value δV produced by the optimum value estimation unit 102, as follows:

$$b = b0 + \frac{\delta Vxy}{\Delta T} \qquad (11)$$

In the above, δVxy is produced by converting the optimum value δV (constituted of the latitude and longitude components) to suit the x-y coordinates system (substantially matching the rotation of the bearing θ) fixedly applied to the vehicle.

It is possible to omit the optimum value estimation unit 102 (which calculates the positional difference and speed difference by way of $\delta Pc = P_{GPS} - P_{INS}$ and $\delta Vc = V_{GPS} - V_{INS}$), so that the optimum values of the position P and the speed V are calculated directly based on $P_{GPS}$, $P_{INS}$, $V_{GPS}$, and $V_{INS}$. In this case, the detection vector and state vector x (which form the input and output of a Karman's filter used for estimation) are appropriately corrected, so that the optimum value of the position P (which is produced based on the calculated value of the state vector x) is directly provided to the navigation software (executed by the CPU 10).

Moreover, it is possible to use other types of bearing sensors such as gyro-sensors instead of the magnetic sensor 13.

When the GPS unit 11 cannot receive GPS signals or when GPS signals do not have an adequate level of reliability, it is possible to calculate the acceleration offset in accordance with the following method shown in FIG. 5 and FIGS. 6A, 6B, and 6C.

Generally speaking, the acceleration (or deceleration) of a vehicle may is completed within a short time (e.g., several seconds) so that the acceleration (or deceleration) actually applied to a vehicle is varied rapidly in a short time, whereas the inclination (or slope) of a road on which the vehicle runs is not varied sharply, so that the acceleration (or deceleration) can be assumed as a constant value which may be maintained in a relatively long time. Based on this observation, it is possible to determine whether the output of the acceleration sensor 12 depends upon the acceleration (or deceleration) actually applied to a vehicle or it depends upon the inclination (or slope) of a road on which the vehicle runs. Based on the determination result, it is possible to precisely calculate the acceleration offset.

Figure 5A:
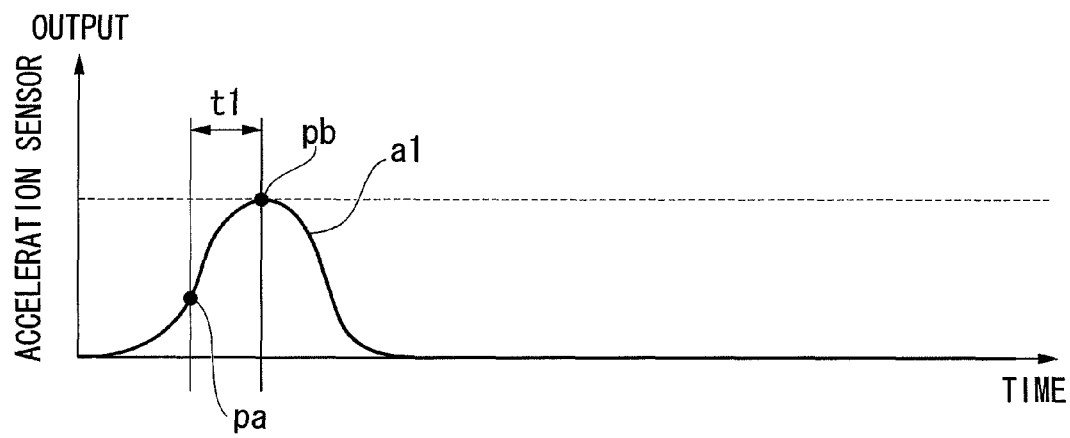
FIG. 5A is a graph showing an acceleration waveform "a1" representing variations of the output of the acceleration sensor due to the acceleration (or deceleration) applied to a vehicle.
Figure 5B:
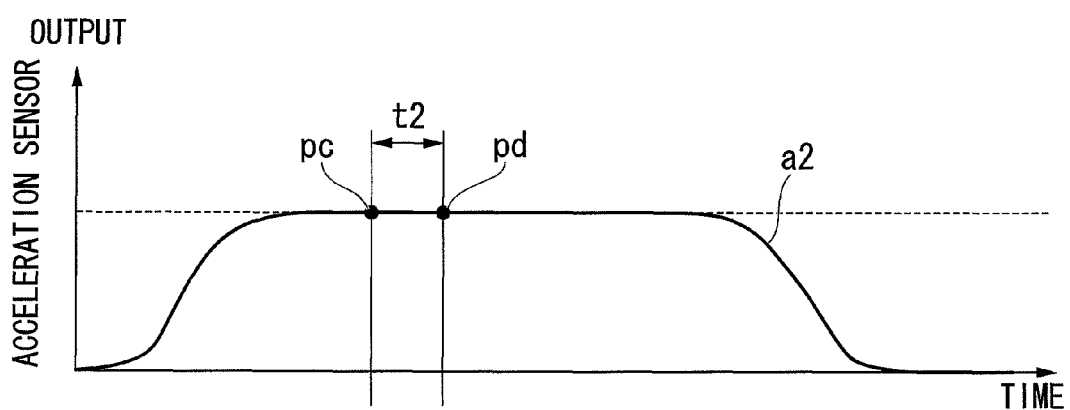
FIG. 5B is a graph showing an acceleration waveform "a2" representing variations of the output of the acceleration sensor due to the inclination (or slope) of a road.

Next, the method how to distinguish the acceleration (or deceleration) applied to a vehicle from the inclination (or slope) of a road will be described in detail. FIGS. 5A and 5B are graphs showing variations of the output of the acceleration sensor 12 in connection with an actual travel manner of a vehicle. FIG. 5A shows an acceleration waveform "a1" representing variations of the output of the acceleration sensor 12 due to the acceleration (or deceleration) applied to a vehicle, wherein the acceleration waveform a1 is greatly varied in level from a point pa to a point pb in a time t1. FIG. 5B shows an acceleration waveform "a2" representing variations of the output of the acceleration sensor 12 due to the inclination (or slope) of a road, wherein the acceleration waveform a2 is not substantially varied in a time t2 ranging from a point pc to a point pd. As described above, variations of acceleration greatly differ between the acceleration (or deceleration) of a vehicle and the inclination (or slope) of a road in a certain time. Based on this observation, the navigation device 1 determines that the acceleration (or deceleration) is applied to a vehicle when the difference between the maximum value and the minimum value of the acceleration, i.e., variations of acceleration, are higher than a preset value, while it determines that the acceleration of a vehicle occurs due to the inclination (or slope) of the road when variations of acceleration are lower than the preset value, whereby it is possible to distinguish the acceleration of the vehicle from the inclination of the road.

Figure 6A:
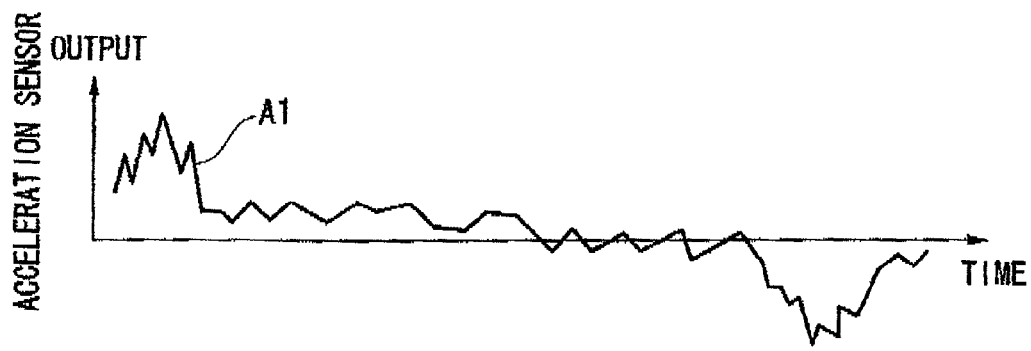
FIG. 6A is a graph showing an acceleration waveform representing variations of acceleration detected by the acceleration sensor.

Next, the method how to calculate the acceleration offset based on the output of the acceleration sensor 12 in accordance with the aforementioned method will be described in detail with reference to FIGS. 6A to 6C, which are used to explain the method how to calculate the acceleration offset based on the output of the acceleration sensor 12. First, the acceleration sensor 12 detects acceleration which is varied in accordance with an acceleration waveform A1 shown in FIG. 6A. A low-pass filter (not shown) is used to suppress the short-period noise representing vibration components of the vehicle, thus producing a filter waveform B1 shown in FIG. 6B.

Figure 6B:
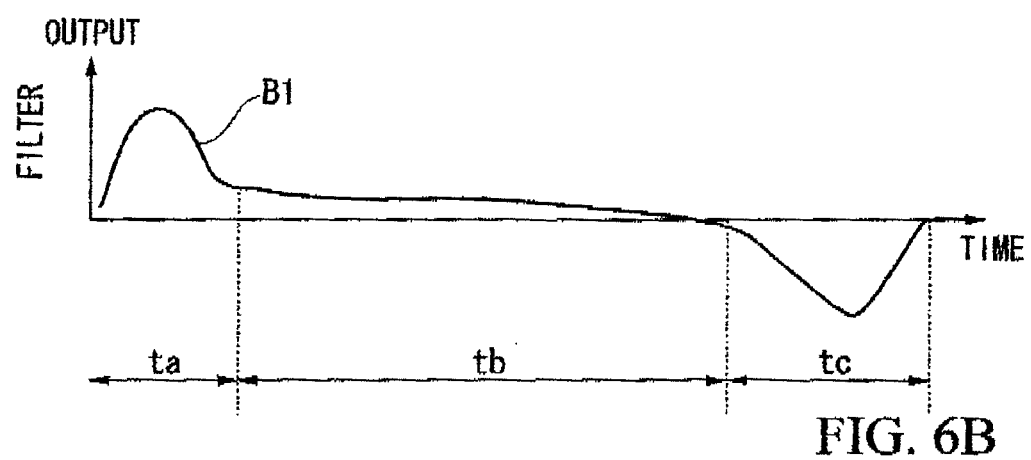
FIG. 6B is a graph showing a filter waveform representing variations of acceleration subjected to low-pass filtering.
Figure 6C:
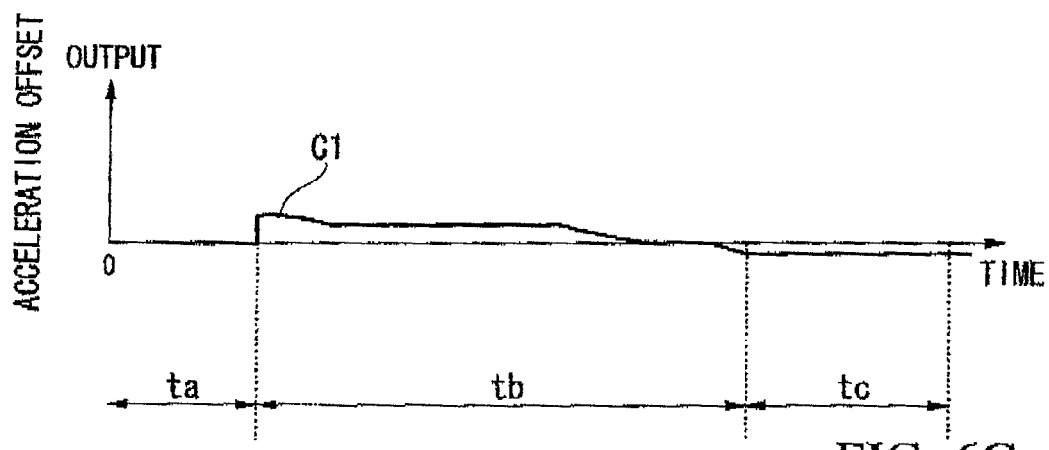
FIG. 6C is a graph showing an offset waveform representing variations of acceleration offset calculated by an acceleration offset calculation unit included in the navigation device.

Based on the filter waveform B1 shown in FIG. 6B, the acceleration offset calculation unit 104 calculates an average value in a prescribed time as well as maximum and minimum values in the prescribed time with respect to acceleration. When the difference between the maximum value and the minimum value is higher than the preset value, the acceleration offset calculation unit 104 determines that the acceleration (or deceleration) is applied to the vehicle. When the difference between the maximum value and the minimum value is lower than the preset value, the acceleration offset calculation unit 104 determines that the acceleration (or deceleration) is not applied to the vehicle, but the vehicle is presently running on a road having a certain inclination (or a slope). With reference to the filter waveform B1, the acceleration offset calculation unit 104 detects the acceleration (or deceleration) in times ta and tc, while it detects the inclination (or slope) of the road in a time tb.

In the time tb in which the acceleration offset calculation unit 104 determines that the acceleration (or deceleration) is not applied to the vehicle, it sets the average value of acceleration as the acceleration offset, which is thus applied to calculations in the time tb. In the times ta and tc in which the acceleration offset calculation unit 104 determines that the acceleration (or deceleration) is applied to the vehicle, it maintains the previous value of the acceleration offset, so that the previous value of the acceleration offset is applied to calculations in the times ta and tc. Since the acceleration offset is not determined at time "0", it maintains the previous value of the acceleration offset, i.e. zero, in the time ta, while it maintains the latest value of the acceleration offset in the time tc. The acceleration offset calculation unit 104 calculates the acceleration offset in accordance with the aforementioned method, then, it outputs the acceleration offset to the INS position calculation unit 101. FIG. 6C shows an offset curve C1 representing variations of the acceleration offset calculated by the acceleration offset calculation unit 104. As described above, the acceleration offset calculation unit 104 is capable of precisely calculating the acceleration offset even when the GPS unit 11 cannot receive GPS signals, or even when GPS signals do not have an adequate level of reliability.

In the actual running condition of the vehicle, the acceleration detected by the acceleration sensor 12 is varied due to a centrifugal force which occurs when the vehicle runs through a curved course of road. In order to precisely determine the acceleration due to the acceleration (or deceleration) applied to the vehicle in consideration of the curved course of road, the acceleration offset calculation unit 104 calculates two components of the acceleration detected by the acceleration sensor 12, i.e., a first component of acceleration, which is applied in the direction corresponding to the corrected bearing θc (representing the running direction of the vehicle which is calculated in step S52), and a second component of acceleration, which is applied in the direction perpendicular to the corrected bearing θc; then, it determines that the detected acceleration depends upon the acceleration (or deceleration) of the vehicle in connection with the first component of acceleration, while it determines that the detected acceleration depends upon the curved course of road corresponding to the centrifugal force in connection with the second component of acceleration. In this connection, it is possible to use only the first component of acceleration (which is applied to the vehicle whose running direction is indicated by the corrected bearing θc) as the acceleration value due to the acceleration (or deceleration) of the vehicle. This makes it possible to calculate the acceleration of the vehicle with a further high level of precision.

Lastly, the present invention is not necessarily limited to the embodiment and variations, which can be further modified within the scope of the invention as defined in the appended claims.

What is claimed is:

1. A navigation device for performing positional guidance, comprising:
 a GPS unit for detecting a first position based on the Global Positioning System and for detecting a first running speed based on the position;
 an acceleration sensor for detecting an acceleration;
 a bearing sensor for detecting a bearing;
 a memory for storing the first position and the first running speed;
 an acceleration determination unit for evaluating an absolute value of the acceleration detected by the acceleration sensor with a prescribed threshold;
 a position calculation unit for calculating a second position based on the first position, the acceleration, the bearing, and the first running speed previously stored in the memory when the acceleration determination unit determines that the absolute value of the acceleration is above the prescribed threshold, the position calculation unit calculating the second position based on the bearing detected by the bearing sensor as well as the first position and the first running speed previously stored in the memory in case of a uniform motion at which the acceleration determination unit determines that the absolute value of the acceleration is below the prescribed threshold;
 an acceleration offset calculation unit that calculates an acceleration offset value based on an acceleration output from the acceleration sensor, wherein the acceleration offset calculation unit sets an average of the acceleration output from the acceleration sensor as the acceleration offset value in a period in which variations of the acceleration output from the acceleration sensor in a predetermined time are below a predetermined value,
wherein the acceleration offset calculation unit maintains a preceding acceleration offset value without changing it when variations of the acceleration output from the acceleration sensor in the predetermined time are above the predetermined value, and
wherein the acceleration determination unit corrects the acceleration output from the acceleration sensor by use of the acceleration offset value calculated by the acceleration offset calculation unit.

2. The navigation device according to claim 1 further comprising:

an optimum value estimation unit for estimating an optimum value of position by way of a Karman's filter based on the first position and the first running speed detected by the GPS unit as well as the second position, which are calculated by the position calculation unit.

3. The navigation device according to claim 1, wherein the bearing sensor is a magnetic sensor which detects the bearing with respect to a reference axis thereof.

* * * * *